H. H. CRISS.
ROOF FRAMING SQUARE.
APPLICATION FILED SEPT. 30, 1910.
1,007,539.
Patented Oct. 31, 1911.
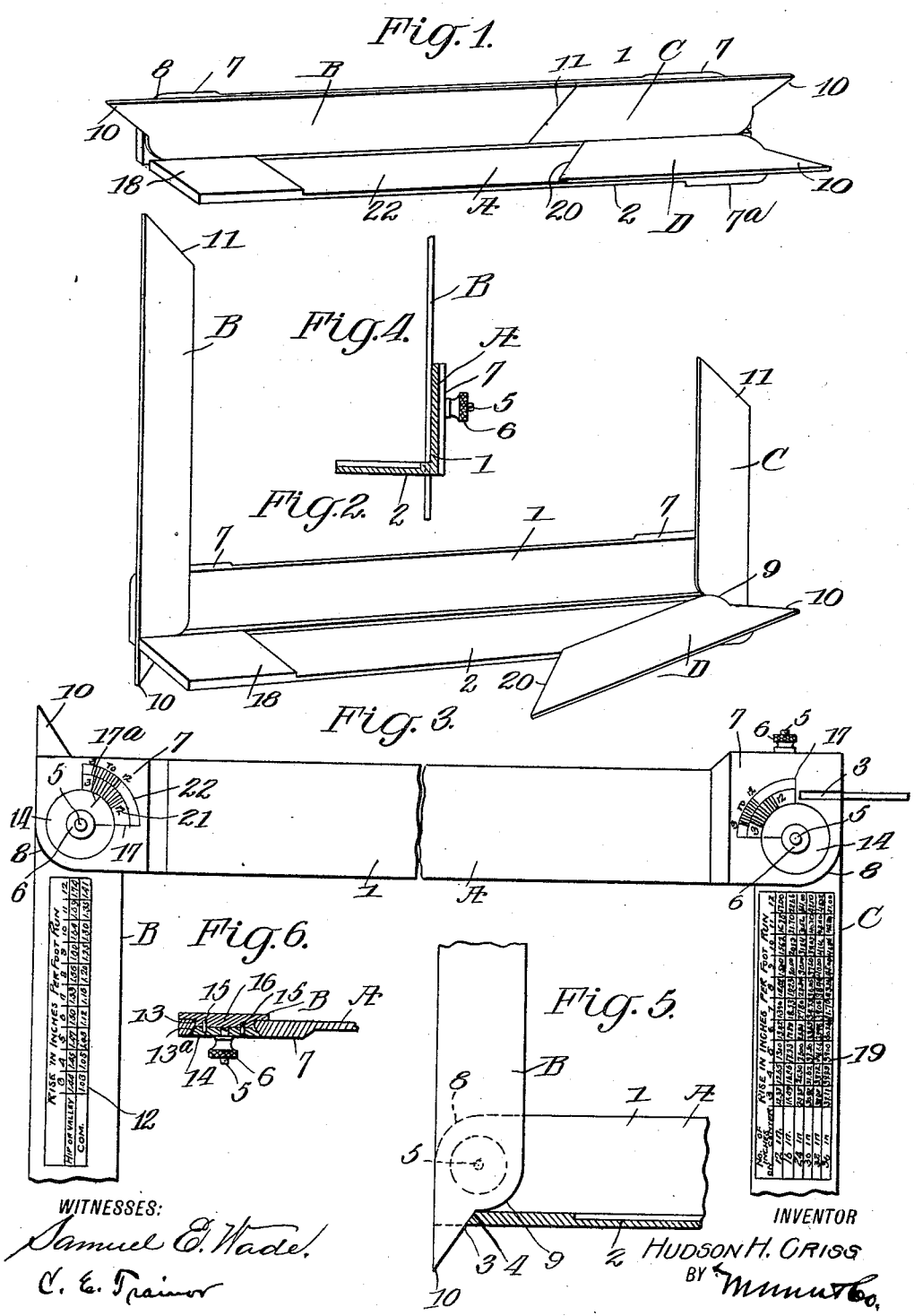
WITNESSES:
INVENTOR
HUDSON H. CRISS
BY
ATTORNEYS

UNITED STATES PATENT OFFICE.

HUDSON H. CRISS, OF GLOBE, ARIZONA TERRITORY.

ROOF-FRAMING SQUARE.

1,007,539.   Specification of Letters Patent.   Patented Oct. 31, 1911.

Application filed September 30, 1910. Serial No. 584,685.

*To all whom it may concern:*

Be it known that I, HUDSON H. CRISS, a citizen of the United States, and a resident of Globe, county of Gila, and Territory of Arizona, have invented certain new and useful Improvements in Roof-Framing Squares, of which the following is a specification.

My invention is an improvement in roof framing squares, and consists in certain novel constructions and combinations of parts, hereinafter described and claimed.

The object of the invention is to provide a simple device of the character specified, by means of which rafters of all kinds may be laid off with absolute correctness, and without the necessity of any calculation upon the part of the user.

Referring to the drawings forming a part hereof, Figure 1 is a perspective view of the improvement folded. Fig. 2 is a similar view partly unfolded. Fig. 3 is an enlarged partial plan view. Fig. 4 is a transverse section near one end. Fig. 5 is an enlarged detail plan view of one end looking at the opposite side from Fig. 3, and, Fig. 6 is a transverse section on the line of the pivotal connection of the blade and handle.

In the present embodiment of the invention, a handle A is provided, to which are pivoted three blades B, C, and D. The handle A is angular in cross section, consisting of two sides 1 and 2, meeting at one edge at a right angle, and at each end the handle is slotted as shown at 3, at the junction of the two sides, the inner ends of the slots being beveled as shown at 4. The side 1 of the handle is enlarged or thickened at each end on its outer face as at 7, and the side 2 is enlarged or thickened at one end on its outer face as shown at 7ª. The blades B, C and D are pivotally connected to the handle in the same manner, so that the connection of but one blade will be described, the construction being the same for each blade.

Each of the blades is connected to the handle by means of a threaded stem 5 formed or secured on the blade extending laterally, and passing through an opening in the handle. Each blade is provided with an enlargement 16 circular in cross section, and concentric with the stem, and the enlargement is received in a circular opening 13 in the handle side. The opening 13 has the edge remote from the blade beveled outwardly as shown at 13ª in Fig. 6, and a disk 14 having undercut side walls is fitted in the end of the opening and abuts against the face of the circular enlargement. Dowel pins 15 are arranged in the disk and enlargement to constrain the disk to move with the blade, and the disk is provided with a central opening through which passes the threaded stem. A thumb nut 6 engages the stem on the outer side of the disk and holds the blade and disk together. The beveled end of the opening and the undercut wall of the disk prevent movement of the blade away from the handle, and the disk will rotate with the blade. The disk is provided with an indicator 17ª, and the handle is provided with an arc-shaped scale 17 arranged alongside the disk and coöperating with the indicator. The scale indicates the angle of the blade with the handle and by loosening the nut 6, either of the blades may be moved with respect to the handle, and when in proper position the tightening of the thumb nut will hold the blade in adjusted position.

The outer corners of the side 1 of the handle are rounded as shown at 8, and one corner of each blade is rounded as shown at 9. The other corner of each blade is provided with a longitudinally extending triangular lug 10, which moves into the slot 3, and limits the opening movement of the blade, holding the said blade at right angles to the handle.

It will be understood that the blades B and C are pivoted to the opposite ends of the handle side 1, while the blade D is pivoted to one end of the handle side 2, adjacent to the blade C. The blades B and C are provided with scales or tables 12 and 19, one on the face of each blade, and the said tables will later be described fully. The free ends of the blades B and C are beveled in the same direction as shown at 11 and the blades are of such length that when folded on the handle side, the end of the blade B abuts the end of the blade C, as indicated in Fig. 1. The inner face of the handle side 2 is thickened on its inner face at 18, at the end remote from the blade D, so that the inner face of the thickened portion is flush with the inner face of the blade. The free end of the blade D is also beveled as shown at 20, and when folded the square is compact, easy to handle, and of light weight. The blades may take any position with respect to the handle from 0° to 90° in accordance with the pitch of the roof, and the indicator 17ª will show the cut for the rafters on the scale 17.

As is known, the jack rafters are the short rafters running from the plate or base to the hip rafters, or from the valley rafters to the ridge, and each pair is shorter than the proceeding pair, the differences in length depending upon the pitch of the roof, and according to the distance of the rafters from each other. For instance with a pitch of eight inches to the foot and a spacing of twenty-four inches, each pair of such rafters is 28.84 inches shorter than the proceeding pair.

The table 19 is designed to give the length of the jack rafters. For instance if the rise per foot of the roof is three inches, and the jack rafters are spaced twelve inches apart, each pair of jack rafters will be 12.37 inches shorter than the preceding pair. The table is arranged for the most common spacing and the most common pitch of roof, the latter running from three inches per foot to twelve inches per foot, and the former from twelve inches spacing to thirty-six inches.

The table 12 is designed to give the length of common or hip and valley rafters, and the length is obtained by multiplying the number under the rise in inches per foot by half the width of the building. For instance, in a building twenty-four feet in width, the number 1.56 is found under the rise in inches per foot for hip and valley rafters. This number multiplied by 12 gives 18.72 feet. For common rafters the number 1.20 is found and by a similar process the result of 14.4 feet is obtained.

The scales 17 are used as follows. Each scale 21—22 is composed of graduations numbered from 3 to 12. The inner scale 21 is made use of to obtain the level of the common and jack rafters, and the outer scale 22 to obtain the level of the hip and valley rafters. It is only necessary to adjust the blade until the indicator 17ª registers with the numeral designating the rise in inches per foot of the roof, and the angle of the blades is the angle of the rafter.

I claim:

1. In a device of the character specified, a handle composed of an angle plate having its two sides arranged at right angles to each other, a blade hinged at each end of one of the sides, and of a length to abut at their ends when folded on said side, said ends being beveled in opposite directions and fitting each other, a blade hinged to one end of the other side, each of said blades having an angular lug extending beyond the side at its end, the handle being slotted to receive the said lug when the blades are at right angles to the handle to limit the opening movement of the blades to such position.

2. In a device of the character specified, a handle having at one end a circular opening, said opening flaring toward one face of the handle, a blade having an enlargement on one face near one end fitting within the opening, and on the opposite side of the handle from the flaring end of the opening, a disk fitting within the flaring end of the opening and abutting against the face of the enlargement, dowel pins connecting the disk and the blade, means for clamping the disk and blade together, the handle having a scale adjacent to the disk and the disk having an indicator coöperating therewith, said blade having a lug extending on the opposite of the handle from the blade, the handle having a stop for engagement by the lug to limit the opening movement of the blade to a position at right angles with the handle.

3. In a device of the character specified, a handle having at one end a circular opening, said opening flaring toward one face of the handle, a blade having an enlargement on one face near one end fitting within the opening, and on the opposite side of the handle from the flaring end of the opening, a disk fitting within the flaring end of the opening and abutting against the face of the enlargement, dowel pins connecting the disk and the blade, and means for clamping the disk and handle together.

HUDSON H. CRISS.

Witnesses:
J. F. BRIGGS,
HIMON THOMAS.

---

Copies of this patent may be obtained for five cents each, by addressing the "Commissioner of Patents, Washington, D. C."